United States Patent [19]

Emerson

[11] 4,332,163
[45] Jun. 1, 1982

[54] CAM BOX ASSEMBLY

[75] Inventor: Reginald S. Emerson, Buckingham, England

[73] Assignee: Leslie Hartridge Limited, Buckingham, England

[21] Appl. No.: 162,664

[22] Filed: Jun. 24, 1980

[30] Foreign Application Priority Data

Jun. 29, 1979 [GB] United Kingdom ................. 7922651

[51] Int. Cl.³ .......................................... G01M 19/00
[52] U.S. Cl. ..................................... 73/119 A; 74/572
[58] Field of Search ........................ 73/119 A, 862.09; 74/572, 574; 83/615, 602

[56] References Cited

U.S. PATENT DOCUMENTS 4,031,420 6/1977 Carini ................................ 74/572 X

OTHER PUBLICATIONS

Opposed Flywheels for Smoother Feed from Product Engineering, vol. 29, No. 33, Aug. 1958, p. 66.

Primary Examiner—Jerry W. Myracle
Attorney, Agent, or Firm—Berman, Aisenberg & Platt

[57] ABSTRACT

A cam box assembly, especially for use with machines for testing fuel injection pumps, comprising a cam shaft in the assembly, drive transmission elements connected to the drive shaft, a first rotatable shaft having a drive connection with the transmission elements, a second rotatable shaft also having a drive connection with the transmission elements, a first flywheel mounted on the first shaft, a second flywheel mounted on the second shaft, the two shafts being co-axial with each other and being driven in opposite directions by the drive transmission elements whereby the flywheels likewise rotate in opposite directions, the flywheels being of identical mass.

3 Claims, 3 Drawing Figures

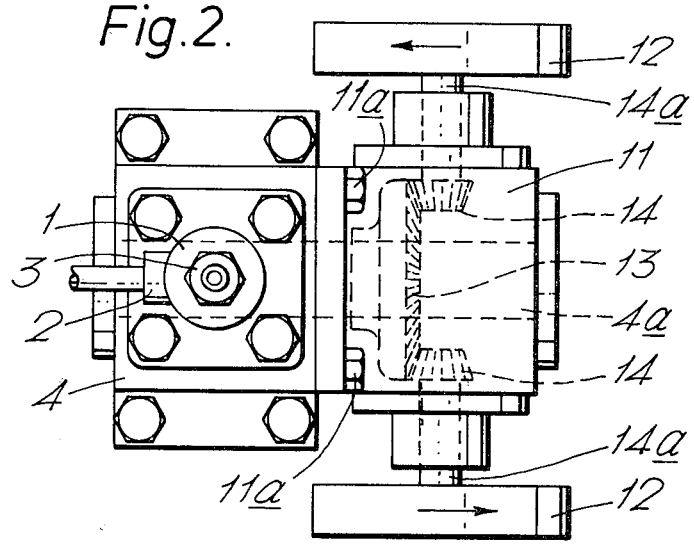
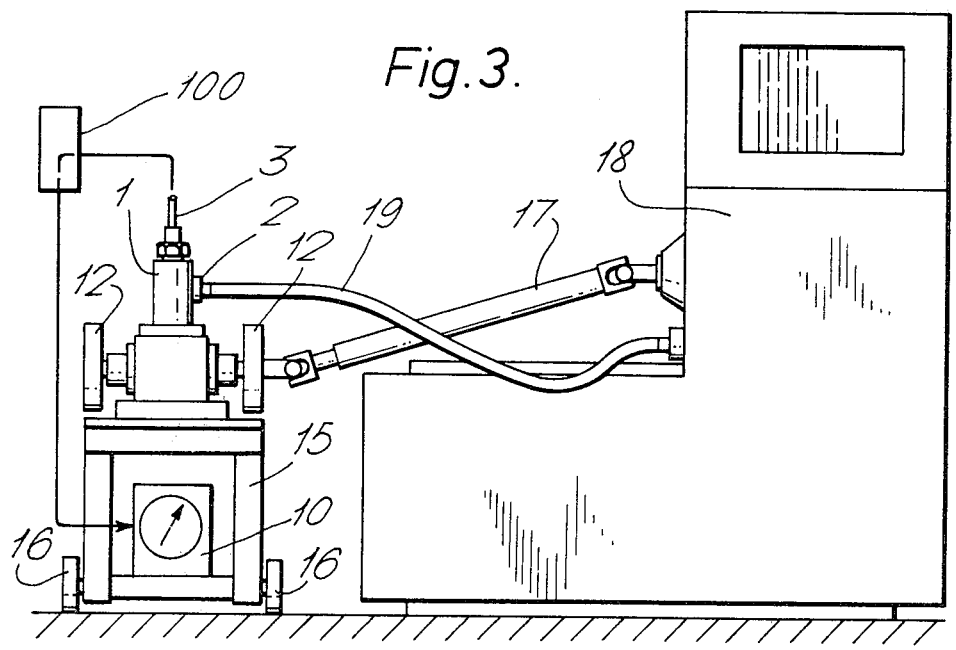

CAM BOX ASSEMBLY

This invention relates to a cam box assembly with contra-rotating flywheels. It has been designed especially for use with light-type fuel injection pump test machines so as to facilitate the testing of single-cylinder injection pumps of the larger sizes, i.e. those usually used on large marine diesel-engines in which, for each engine cylinder, there is a respective single-cylinder pump delivering upwards of 5000 mm³ per stroke of fuel oil at a pressure in the region of 1000 bar. The invention is not, however, restricted to such use and may also be applied to equipment other than such test machines.

Hitherto, the testing of single-cylinder injection pumps of the larger sizes has been carried out on large, expensive, solidly-built test machines having a heavy flywheel and a heavy mounting bed. By way of illustration, and to high-light the advance made by the present invention, a typical test machine of the kind used in the past is shown in side view in FIG. 1 of the accompanying drawings. The pump 1 being tested on the machine has a fuel inlet 2 and a fuel outlet 3. It is bolted or clamped onto a cam box 4 forming part of the machine, the cam box having a cam-shaft 4a on which a cam (not shown) is mounted or formed to actuate the pump. Carried on that part of the cam-shaft which projects from the cam box is a heavy flywheel 5 having a diameter of perhaps 1.5 meters. The flywheel needs to be massive in order to ensure that the rotational speed of the shaft 4a does not vary by more than 1%. The necessary moment of inertia I of the flywheel is given by the equation:

$$I \approx 480\, Q/n^2$$

where I is in kg m², Q = pump delivery in mm³/stroke and n = r.p.m.

Beyond the flywheel 5, the shaft 4a is connected to a variable-speed transmission unit 6 having an externally-mounted speed-control 7. An electric motor 8 or other prime mover drives the variable-speed transmission unit through a shaft 8a. The motor 8, the unit 6 and the cam box 4 are all three bolted down by bolts 9a onto a heavy mounting bed 9 which is itself anchored by further bolts 9b to a concrete foundation. A meter 10 is mounted on legs 10a fastened to the variable-speed transmission unit 6 in order to measure the calibration fluid delivered by the pump 1 through its outlet 3. The machine also has an injector 100 and a tank (not shown) for storing calibration fluid, and a hydraulic circuit for supplying such fluid to the injection pump at a predetermined pressure and temperature.

The above-described test machine serves to test the pump 1 before it is installed on an engine or after it has been removed from an engine for overhaul or repair. Calibration fluid fed to the pump through the inlet 2 is delivered from the pump through the outlet 3 by rotation of the cam shaft 4a such that the whole volume of fluid in one injection stroke is displaced from the pump during approximately 10° of rotation of the cam shaft. This means that the whole of the energy required by each delivery of fluid must be produced by the test bench over a very short period of time during each revolution. It is to ensure that the mean speed of the cam shaft 4a does not fluctuate during the delivery of this pulse of energy that the very large flywheel 5 is mounted close to the cam itself in order to avoid wind-up in the transmission. At the same time, the cambox 4 requires to be mounted securely onto the very heavy base 9 in order that the torque reaction from the flywheel 5 does not displace the cam box in an angular sense during the period of the delivery of fluid. It is for these reasons that test machines of this nature are cumbersome and expensive, and the aim of the present invention therefore is to provide equipment having a comparable or better performance but in which the requirement for a heavy flywheel and a heavy mounting bed are obviated.

With this aim in view, the invention is directed to a cam box attached to a gear box and having a cam shaft which passes into the gear box and carries a bevel gear wheel meshing with two opposing, spaced-apart, co-axial bevel pinions carried on respective shafts each of which carries a comparatively small flywheel.

It will be seen that, because the two flywheels rotate in opposite directions, the torque reactions developed by each of these flywheels when a fluid delivery occurs from the injection pump will be imparted to the cam box/gear box assembly in an opposing angular direction and will therefore negate each other. There is, therefore, no necessity to mount the cam box/gear box assembly onto a heavy bed since there is no longer any torque reaction, with respect to space, to absorb. There is, of course, still a torque reaction at the cam box itself, but it is opposed by an equal and opposite reaction from the gear box and so is contained in a closed loop within the cam box/gear box assembly.

An example of a cam box assembly in accordance with the invention is shown in FIGS. 2 and 3 of the accompanying drawings, in which:

FIG. 2 is a plan view of the cam box assembly; and

FIG. 3 is a side view of the cam box assembly, on a smaller scale, connected up to a test bench.

Figure 1:
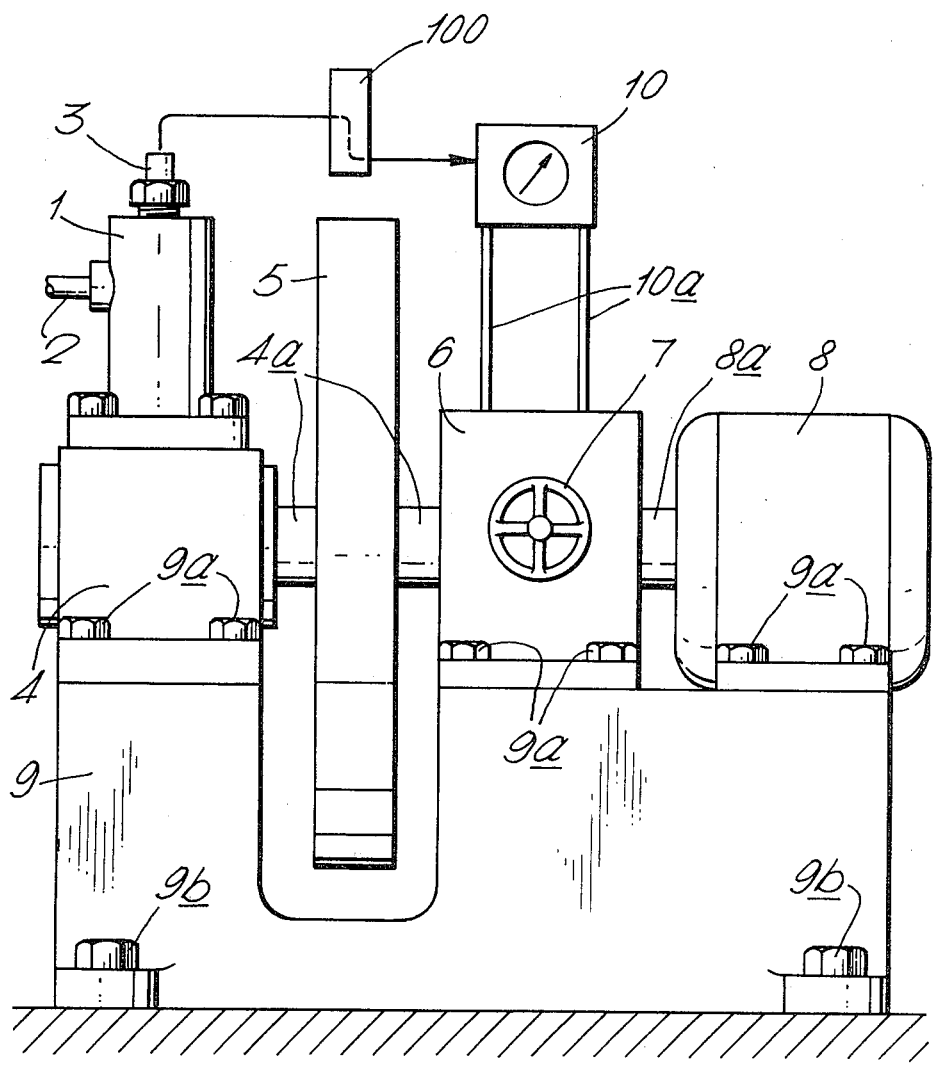
FIG. 1 is a side view of a typical injection pump tester

The assembly shown in FIG. 2 comprises a cam box 4 like that shown in FIG. 1. In this case, however, the camshaft 4a projects from the cam box into a gear box 11 which is bolted by bolts 11a to one side of the cam box. The gear box has one slow speed output formed by a crown wheel (bevel gear wheel) 13 mounted on the shaft 4a, and two high speed inputs formed by opposing, spaced-apart, co-axial bevel pinions 14 which run in opposite directions, the pinions 14 being carried on respective shafts 14a each of which carries a comparatively small flywheel 12.

If the ratio between each of the inputs and the output be r, then, in order to maintain a speed fluctuation comparable with the flywheel shown in FIG. 1, the moment of inertia of each flywheel 12 will be $I/r^2 \times 2$. Where r equals, for example, 4:1, each flywheel 12 will therefore need a moment of inertia equal to only 1/32nd of that of the flywheel 5. This means that the two flywheels 12 will be comparatively light-weight. As a result, the cam box/gear box assembly of FIG. 2 can be mounted on a mobile light table 15 having wheels 16, an injector 100 and a meter 10 as shown in FIG. 3. In other words, the support for the cam box no longer needs to be a heavy bed as in FIG. 1 because the torque reactions of the two small flywheels 12 are equal and opposite and are contained within the cam box/gear box assembly.

Another advantage of the assembly illustrated in FIG. 3 is that a telescopic transmission shaft 17 with two universal joints (as used on road vehicles) can be used to drive the cam box/gear box assembly from a conventional, light, fuel injection pump test bench 18 containing a prime mover, a variable speed transmission, and a fluid supply system which includes a fluid supply pipe 19 leading to the inlet 2 of the pump 1 under test.

Quite apart from the advantages mentioned above, the arrangement shown in FIG. 3 permits less deflection of the cam box 4 in response to the energy absorbed by the delivery of fluid than is the case in the conventional machine of FIG. 1 because a mounting bed, however heavy, must respond to some extent to a suddenly applied torque because its moment of inertia cannot be infinite.

Because the pump 1 is designed to run relatively slowly, the flywheels 12 can run at a much higher speed according to the selected gear ratio in the gear box. The flywheel's moment of inertia with reference to the cam shaft 4a is therefore increased by the square of the ratio and, as indicated already, it is possible to reduce the moments of inertia of the small flywheels 12 to as little as 1/32nd of the moment of inertia of the flywheel 5 shown in FIG. 1.

I claim:

1. A cam box assembly, especially for use with machines for testing fuel injection pumps, comprising a cam box, a cam shaft in said cam box, drive transmission means connected to said cam shaft, a first rotatable shaft drivingly connected to said drive transmission means, a second rotatable shaft drivingly connected to said drive transmission means, a first flywheel mounted on said first shaft, and a second flywheel mounted on said second shaft and of identical mass to said first flywheel, said two shafts being co-axial with each other and being arranged to rotate in opposite directions by reason of their connection with said drive transmission means whereby said flywheels likewise rotate in opposite directions, and said drive transmission means comprising a slow-speed output formed by a crown wheel and two higher-speed inputs formed by opposing, spaced-apart, coaxial bevel pinions arranged to rotate in opposite directions and carried on said two contra-rotating shafts.

2. A cam box assembly according to claim 1, wherein said contra-rotating shafts have a drive connection with a machine for testing fuel injection pumps.

3. A cam box assembly for use with machines for testing fuel injection pumps, comprising a cam box, a cam shaft in said cam box, a gear which is mounted on said cam shaft, a first gear pinion and a second gear pinion each in meshing engagement with said gear wheel, said first and second gear pinions being mounted on a respective one of two co-axial shafts, and two flywheels of identical mass each mounted on a respective one of said two co-axial shafts, said first and second gear pinions being mounted on opposite sides of the axis of rotation of said cam shaft so as to rotate in opposite directions to each other whereby said two co-axial shafts and said two flywheels thereon likewise rotate in opposite directions.

* * * * *